United States Patent
Oh et al.

(10) Patent No.: US 10,906,373 B2
(45) Date of Patent: Feb. 2, 2021

(54) VEHICLE HEAT MANAGEMENT SYSTEM

(71) Applicants: Hyundai Motor Company, Seoul (KR); Kia Motors Corporation, Seoul (KR)

(72) Inventors: Man Ju Oh, Gyeonggi-do (KR); Jae Woong Kim, Gyeonggi-do (KR); Sang Shin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/192,868

(22) Filed: Nov. 16, 2018

(65) Prior Publication Data

US 2020/0031191 A1 Jan. 30, 2020

(30) Foreign Application Priority Data

Jul. 25, 2018 (KR) .................. 10-2018-0086820

(51) Int. Cl.
*B60K 11/04* (2006.01)
*B60K 11/02* (2006.01)
(Continued)

(52) U.S. Cl.
CPC ..... *B60H 1/00278* (2013.01); *B60H 1/00385* (2013.01); *B60H 1/00392* (2013.01);
(Continued)

(58) Field of Classification Search
CPC ............... B60H 1/323; B60H 1/00278; B60H 1/00885; B60H 1/00932;
(Continued)

(56) References Cited

U.S. PATENT DOCUMENTS 1,366,900 A * 2/1921 Benson ............... F01P 7/14
165/101
5,730,089 A * 3/1998 Morikawa .......... B60H 1/00885
123/41.14
(Continued)

FOREIGN PATENT DOCUMENTS

CA 2943303 A1 * 9/2015 ......... B60H 1/00392
CA 2943304 A1 * 9/2015 ......... B60H 1/00885
(Continued)

*Primary Examiner* — Len Tran
*Assistant Examiner* — Jenna M Hopkins
(74) *Attorney, Agent, or Firm* — Mintz Levin Cohn Ferris Glovsky and Popeo, P.C.; Peter F. Corless (57) ABSTRACT

A vehicle heat management system is provided. The system includes a radiator module having a battery radiator and an electric component radiator. A valve module has an inner space that is divided into a first chamber and a second chamber. Each chamber includes a first passage, a second passage, and a third passage. The first passage connects each chamber to a battery radiator, the second passage connects each chamber to a high-voltage battery core, and the third chamber connects each chamber to an electric component radiator and an electric component core. Each chamber includes therein a guide unit that selectively closes the first passage, the second passage, or the third passage depending on a rotation angle thereof. An actuator that is connected to the guide unit adjusts the rotation angle of the guide unit.

14 Claims, 11 Drawing Sheets

(51) Int. Cl.
*F01P 7/14* (2006.01)
*F01P 7/16* (2006.01)
*B60L 58/26* (2019.01)
*B60H 1/22* (2006.01)
*B60H 1/14* (2006.01)
*B60H 1/32* (2006.01)
*B60H 1/00* (2006.01)
*B60H 1/03* (2006.01)
*F28D 21/00* (2006.01)
*F28D 1/04* (2006.01)

(52) U.S. Cl.
CPC ..... *B60H 1/00485* (2013.01); *B60H 1/00885* (2013.01); *B60H 1/00899* (2013.01); *B60H 1/00914* (2013.01); *B60H 1/03* (2013.01); *B60K 11/02* (2013.01); *B60K 11/04* (2013.01); *B60L 58/26* (2019.02); *F01P 7/14* (2013.01); *F01P 7/165* (2013.01); *B60H 1/00* (2013.01); *B60H 1/00007* (2013.01); *B60H 1/00328* (2013.01); *B60H 1/143* (2013.01); *B60H 1/2215* (2013.01); *B60H 1/32* (2013.01); *B60H 1/323* (2013.01); *B60H 1/3227* (2013.01); *B60H 2001/00307* (2013.01); *B60H 2001/00928* (2013.01); *F28D 1/0417* (2013.01); *F28D 1/0435* (2013.01); *F28D 1/0443* (2013.01); *F28D 1/0452* (2013.01); *F28D 2021/008* (2013.01); *F28D 2021/0091* (2013.01); *F28D 2021/0092* (2013.01)

(58) Field of Classification Search
CPC ............ B60H 2001/00928; B60H 1/00; B60H 1/0007; B60H 1/00385; B60H 1/00914; B60H 1/142; B60H 1/32; B60H 1/2215; B60H 1/3227; B60H 1/00328; B60H 1/0024; B60H 1/0034; B60H 3/024; B60H 2001/00935; B60H 1/00392; B60H 2001/00307; B60H 1/143; B60H 1/00899; B60H 1/03; F28D 1/0417; F28D 1/0435; F28D 1/0443; F28D 1/0452; F28D 2021/008; F28D 2021/0091; F28D 2021/0092; F28D 7/0066; F28B 25/005; F01P 7/14; F01P 7/165; F01P 2007/143; F01P 2007/146; B60K 11/02; B60K 11/04
See application file for complete search history.

(56) References Cited

U.S. PATENT DOCUMENTS

| | | | | | |
|---|---|---|---|---|---|
| 5,957,377 | A  * | 9/1999 | Inoue | .................... | F16K 11/085 137/625.32 |
| 5,975,421 | A  * | 11/1999 | Ito | ...................... | B60H 1/00485 237/12.3 B |
| 6,223,772 | B1 * | 5/2001 | Cummings | ........ | B60H 1/00007 137/595 |
| 6,240,941 | B1 * | 6/2001 | Small | .................. | F16K 27/003 137/1 |
| 6,308,739 | B1 * | 10/2001 | Barbuto | ................ | F16K 5/0478 137/625.11 |
| 6,370,903 | B1 * | 4/2002 | Wlech | ................ | B60H 1/32281 62/324.6 |
| 6,983,764 | B2 * | 1/2006 | Arrowood, Jr. | ....... | F16K 11/105 137/595 |
| 7,131,460 | B2 * | 11/2006 | McLane | ............. | B60H 1/00485 137/625.47 |
| 7,191,858 | B2 * | 3/2007 | Vanderwees | ............ | F01P 7/165 180/65.31 |
| 7,789,176 | B2 * | 9/2010 | Zhou | .................. | B60H 1/00278 180/65.1 |
| 8,671,982 | B2 * | 3/2014 | Stoermer | ............ | F16K 11/0856 123/41.1 |
| 9,533,547 | B2 * | 1/2017 | Cheng | .................... | H02J 7/0018 |
| 9,561,704 | B2 * | 2/2017 | Enomoto | ............ | B60H 1/00485 |
| 9,680,190 | B1 * | 6/2017 | Xia | ...................... | H01M 10/615 |
| 9,803,760 | B2 * | 10/2017 | Morein | ................ | F16K 27/065 |
| 2009/0317697 | A1 * | 12/2009 | Dogariu | ............ | B60H 1/00885 429/62 |
| 2011/0132017 | A1 * | 6/2011 | Kim | .................. | H01M 8/04029 62/259.2 |
| 2012/0225341 | A1 * | 9/2012 | Major | .................... | B60H 1/143 429/120 |
| 2014/0102126 | A1 * | 4/2014 | Aoun | ................ | B60H 1/00328 62/244 |
| 2015/0034272 | A1 * | 2/2015 | Saab | .................... | B60H 1/2215 165/43 |
| 2015/0101789 | A1 * | 4/2015 | Enomoto | ................ | B60L 1/003 165/202 |
| 2015/0354716 | A1 * | 12/2015 | Morein | ................. | F16K 27/065 137/625.47 |
| 2016/0031291 | A1 * | 2/2016 | Enomoto | ............... | B60K 11/02 62/179 |
| 2016/0107506 | A1 * | 4/2016 | Johnston | ............ | B60H 1/00921 165/202 |
| 2016/0107508 | A1 * | 4/2016 | Johnston | ................ | B60H 1/143 165/202 |
| 2016/0159246 | A1 * | 6/2016 | Jung | ....................... | B60K 1/00 62/243 |
| 2016/0167481 | A1 * | 6/2016 | Makihara | ............... | B60K 11/02 237/5 |
| 2016/0178253 | A1 * | 6/2016 | Katoh | .................... | F25B 25/005 62/185 |
| 2017/0106724 | A1 * | 4/2017 | Porras | ................. | B60H 1/00385 |
| 2017/0106725 | A1 * | 4/2017 | Kim | ................... | B60H 1/00278 |
| 2017/0152957 | A1 * | 6/2017 | Roche | .............. | H01M 10/6568 |
| 2017/0361677 | A1 * | 12/2017 | Kim | .................... | H01M 10/663 |
| 2018/0072130 | A1 * | 3/2018 | Kim | .................... | B60H 1/00007 |
| 2018/0178615 | A1 * | 6/2018 | Xia | .................... | B60H 1/00392 |
| 2018/0281557 | A1 * | 10/2018 | Park | .................... | B60H 1/2221 |
| 2018/0345756 | A1 * | 12/2018 | He | .................... | B60H 1/00885 |
| 2018/0345757 | A1 * | 12/2018 | Oh | .................... | B60H 1/00899 |
| 2019/0030991 | A1 * | 1/2019 | Enomoto | ................ | B60H 1/08 |
| 2019/0145675 | A1 * | 5/2019 | Kim | .................... | B60H 1/00278 62/324.6 |
| 2019/0168569 | A1 * | 6/2019 | Lee | .......................... | B60H 1/14 |
| 2019/0219181 | A1 * | 7/2019 | Takahashi | ............... | F16K 31/04 |
| 2019/0225047 | A1 * | 7/2019 | Porras | ................. | B60H 1/00271 |
| 2019/0309674 | A1 * | 10/2019 | Han | ...................... | F01P 11/029 |

FOREIGN PATENT DOCUMENTS

| | | | | |
|---|---|---|---|---|
| DE | 102013206630 A1 * | 10/2014 | ............ | B60H 1/143 |
| EP | 2497662 A2 * | 9/2012 | ......... | B60H 1/00921 |
| JP | 2014020280 A * | 2/2014 | ............ | B60H 1/143 |
| JP | 2017065440 A * | 4/2017 | ......... | B60H 1/00335 |
| KR | 101448656 B1 | 10/2014 | | |
| WO | WO-2010051198 A2 * | 5/2010 | ............ | B60H 1/323 |
| WO | WO-2013114874 A1 * | 8/2013 | ......... | B60H 1/00278 |
| WO | WO-2013114880 A1 * | 8/2013 | ................ | F28F 1/00 |
| WO | WO-2014162702 A1 * | 10/2014 | ......... | B60H 1/00385 |
| WO | WO-2014167796 A1 * | 10/2014 | ......... | B60H 1/00278 |
| WO | WO-2015103548 A1 * | 7/2015 | ............ | B60H 1/143 |
| WO | WO-2017199654 A1 * | 11/2017 | ............... | F16K 5/04 |
| WO | WO-2018069629 A1 * | 4/2018 | ......... | B60H 1/32281 |

* cited by examiner

VEHICLE HEAT MANAGEMENT SYSTEM

CROSS REFERENCE TO RELATED APPLICATION

The present application claims priority to Korean Patent Application No. 10-2018-0086820, filed Jul. 25, 2018, the entire contents of which is incorporated herein for all purposes by this reference.

BACKGROUND

1. Field of the Disclosure

The present disclosure relates to a vehicle heat management system, and more particularly, to a vehicle heat management system that varies the cooling surface of a high-voltage battery core and an electric component core based on the state of the vehicle.

2. Description of the Prior Art

Recently, electric vehicles are emerging to implement environmentally friendly technologies and to solve a problem such as energy depletion. An electric vehicle operates using a motor that receives electricity supplied from the battery and outputs power. Therefore, there is no emission of carbon dioxide, there is minimal noise, and the energy efficiency of the motor is higher than the energy efficiency of an engine, and thus the electric vehicle is attracting attention as an environmentally friendly vehicle.

The key technology for implementing such an electric vehicle is the technology related to a battery module. Recently, research regarding the weight reduction, miniaturization, and reduced charging time of a battery has been actively conducted. The battery module may maintain optimal performance and long service life when used in an optimal temperature environment. However, it may be difficult to use the battery in the optimum temperature environment due to the heat generated during driving and an external temperature change.

In addition, since the electric vehicle does not have a waste heat source for the heat generated during the combustion in an engine such as an internal combustion engine, it is necessary to perform indoor heating of the vehicle in the winter or during colder temperatures using an electric heating device and to perform warm-up to improve the charge and discharge performance of the battery during a cold period. Therefore, an electric heater for heating the cooling water is separately configured and used. In other words, to maintain the optimum temperature environment of the battery module, a cooling and heating system for adjusting the temperature of the battery module is adopted separately from a heating and cooling system for indoor HVAC of the vehicle. Two independent cooling and heating systems are built, one of which is used for indoor cooling and heating, and the other is used for temperature control of the battery module.

It should be understood that the foregoing description of the background art is provided merely for the purpose of promoting an understanding of the background of the present disclosure and is not to be construed as an admission that the foregoing description corresponds to the prior art, which has already been known to those skilled in the art.

SUMMARY

An aspect of the present disclosure provides a vehicle heat management system that minimizes the volume package of a heat management apparatus while varying radiator heat-radiating areas of a high-voltage battery core and an electric component core according to the state of an electric vehicle.

In order to achieve the aspect described above, a vehicle heat management system according to the present disclosure may include: a radiator module having a battery radiator and an electric component radiator; a valve module having an inner space divided into a first chamber and a second chamber, each of may include a first passage, a second passage, and a third passage, in which the first passage connects each of the chambers to a battery radiator, the second passage connects each of the chambers to a high-voltage battery core, and the third chamber connects each of the chambers to an electric component radiator and an electric component core, and each of the chambers may be provided therein with a guide unit, which is configured to adjust an opening of the first passage, the second passage, or the third passage based on a rotation angle thereof; and an actuator connected to the guide unit to adjust the movement of the guide unit.

The valve module may include a separation wall that divides an inner space of the valve module into upper and lower portions to divide the inner space of the valve module into a first chamber in the upper portion and a second chamber in the lower chamber through the separation wall. The guide unit of the first chamber and the guide unit of the second chamber may be integrally formed to be connected to each other, and may be configured to close, by rotation, corresponding passages among the first, second, and third passages disposed in the first chamber and the first, second, and third passages disposed in the second chamber. In the radiator module, the battery radiator and the electric component radiator may be stacked with each other in the thickness direction.

The passages in the first chamber and the passages in the second chamber may be connected to a cooling water inlet side and a cooling water outlet side of components, which are connected thereto, respectively, to cause the cooling water to circulate through the components and the battery radiator or the electric component radiator. Between the second passage in the first chamber and the second passage in the second chamber, the high-voltage battery core may be disposed to be connected to the first pump in series with each other. Between the second passage in the first chamber and the second passage in the second chamber, a battery heat exchange line may be disposed to be connected to the high-voltage battery core and the first pump in parallel with each other and to pass through a water heater and a battery chiller. The battery heat exchange line may be configured such that a flow of cooling water is adjusted by an on-off valve.

The vehicle heat management system may further include a controller configured to control the actuator to close the third passages in the first chamber and the second chamber, close the on-off valve, and drive the first pump when battery cooling is required. The vehicle heat management system may further include a controller configured to control the actuator to close the second passages in the first chamber and the second chamber, open the on-off valve, drive the first pump, and operating the water heater when battery heater warming is required. Between the third passage in the first chamber and the third passage in the second chamber, the electric component core and the second pump may be provided so as to be connected in series to each other, and the electric component radiator may be provided so as to be connected in parallel to the electric component core and the second pump.

The vehicle heat management system may further include a controller configured to operate the actuator to close the second passages in the first chamber and the second chamber, open the on-off valve, and operate the first pump and the second pump when electric component cooling and battery coolant cooling are required. The vehicle heat management system may further include a controller configured to operate the actuator to close the first passages in the first chamber and the second chamber, close the on-off valve, and operate the first pump or the second pump when electric component waste heat recovery is required.

The vehicle heat management system may further include a controller configured to operate the actuator to close the second passages in the first chamber and the second chamber, and operate the second pump when electric component cooling is required. The vehicle heat management system may further include a controller configured to operate the actuator to close the second passages in the first chamber and the second chamber, close the on-off valve, and operate the first pump and the second pump when electric component cooling and battery cooling are required.

According to the vehicle heat management system constructed as described above, it may be possible to vary the heat radiating area of the heat exchange radiators of the high-voltage battery core and the electric component core based on the state of the electric vehicle, and thus, optimal heat management efficiency may be implemented and merchantable quality of the vehicle may be improved. In addition, in the radiator module, the battery radiator and the electric component radiator are configured to have optimal heat exchange efficiency to improve the heat management performance of the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a vehicle heat management system according to an exemplary embodiment of the present disclosure will be described with reference to the accompanying drawings.

Figure 1:
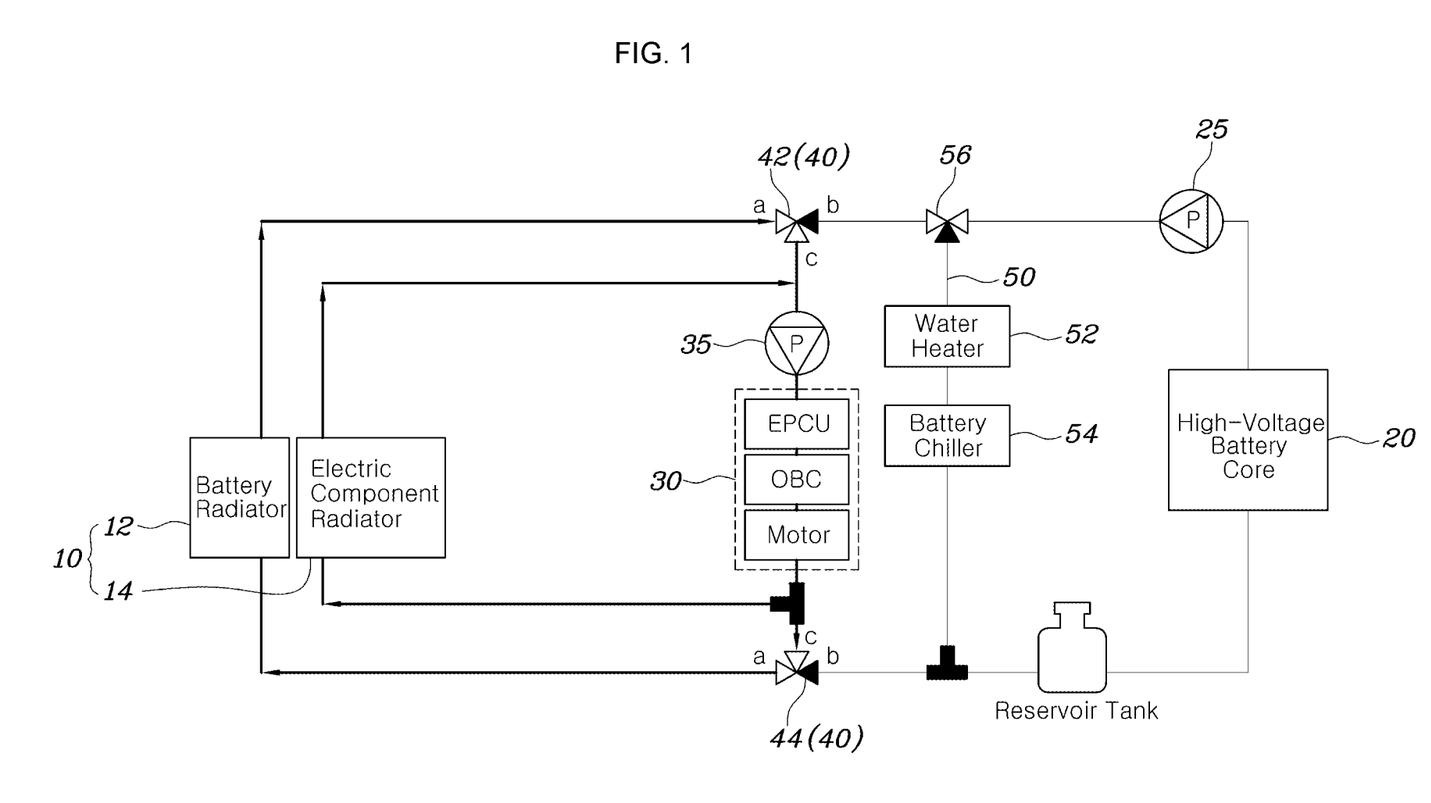
FIG. 1 is a block diagram schematically illustrating a vehicle heat management system according to an exemplary embodiment of the present disclosure.

FIG. 1 is a block diagram schematically illustrating a vehicle heat management system according to an exemplary embodiment of the present disclosure. Referring to FIG. 1, the vehicle heat management system according to the present disclosure may include: a radiator module 10 having a battery radiator 12 and an electric component radiator 14; a valve module 40 having an inner space divided into a first chamber 42 and a second chamber 44, each of which is provided with a first passage 42a or 44a, a second passage 42b or 44b, and a third passage 42c or 44c. The first passage 42*a* or 44*b* connects each of the chambers to a battery radiator 12, the second passage 42*b* or 44*b* connects each of the chambers to a high-voltage battery core 20, and the third chamber 42*c* or 44*c* connects each of the chambers to an electric component radiator 14 and an electric component core 30. Each of the chambers may include therein a guide unit 46 configured to adjust an opening degree of the first passage 42*a* or 44*a*, the second passage 42*b* or 44*b*, or the third passage 42*c* or 44*c* or to selectively close the first passage 42*a* or 44*a*, the second passage 42*b* or 44*b*, or the third passage 42*c* or 44*c* based on a rotation angle thereof; and an actuator 60 connected to the guide unit 46 to adjust the rotation angle of the guide unit 46.

In other words, in the present disclosure, the battery radiator 12 configured to receive the cooling water passing through the high-voltage battery core 20 and to cool the cooling water through heat exchange with external air, and the electric component radiator 14 configured to receive the cooling water passing through the electric component core 30 and to cool the cooling water through heat exchange with external air may be provided integrally with each other to constitute a radiator module 10. The radiator module 10 may include the guide unit 46 to receive the cooling water from the high-voltage battery core 20 or the electric component core 30 based on the rotation angle of the guide unit 46 in the inner space of the valve module 40. In particular, the rotation angle of the guide unit 46 may be adjusted by an actuator 60 that operates according to the state of the vehicle, and a detailed operation thereof will be described later.

The high-voltage battery core 20 may be configured to perform heat exchange between the high-voltage battery and the cooling water, and the electric component core 30 may include an electric power control unit (EPCU), an on-board charger (OBC), and a motor and configured to perform heat exchange with the cooling water. Particularly, the valve module 40 may include a separation wall 48 that divides the inner space thereof into upper and lower portions and the inner space of the valve module 40 may be divided into the first chamber 42 in the upper portion and the second chamber 44 in the lower portion through the separation wall 48. In other words, since the inner space of the valve module 40 is partitioned by the separation wall 48 in the vertical direction, thereby forming the first chamber 42 and the second chamber 44, and each of the chambers is configured such that the cooling water flows in and out through the first, second, and third passages, which are formed in each of the chambers.

In the present disclosure, the guide unit 46 of the first chamber 42 and the guide unit 46 of the second chamber 44 may be integrally formed to be connected to each other, and may be configured to close, by rotation, corresponding passages among the first, second, and third passages provided in the first chamber 42 and the first, second, and third passages provided in the second chamber 44. For example, the guide unit 46 may be provided in the first and second chambers 42 and 44 through the separation wall 48. In particular, the portion penetrating the separation wall 48 may be sealed to prevent the cooling water from flowing out between the first chamber 42 and the second chamber 44.

However, the guide unit 46 is not necessarily provided to penetrate the separation wall 48, and actuators 60 may be provided such that each of the actuators 60 may be operated in the same manner by the actuator 60. This is variable depending on a designer or a vehicle, and should not be construed as being limited. In addition, the radiator module 10 of the present disclosure may be configured such that the battery radiator 12 and the electric component radiator 14 are arranged to be stacked to each other in the thickness direction.

Figure 2:
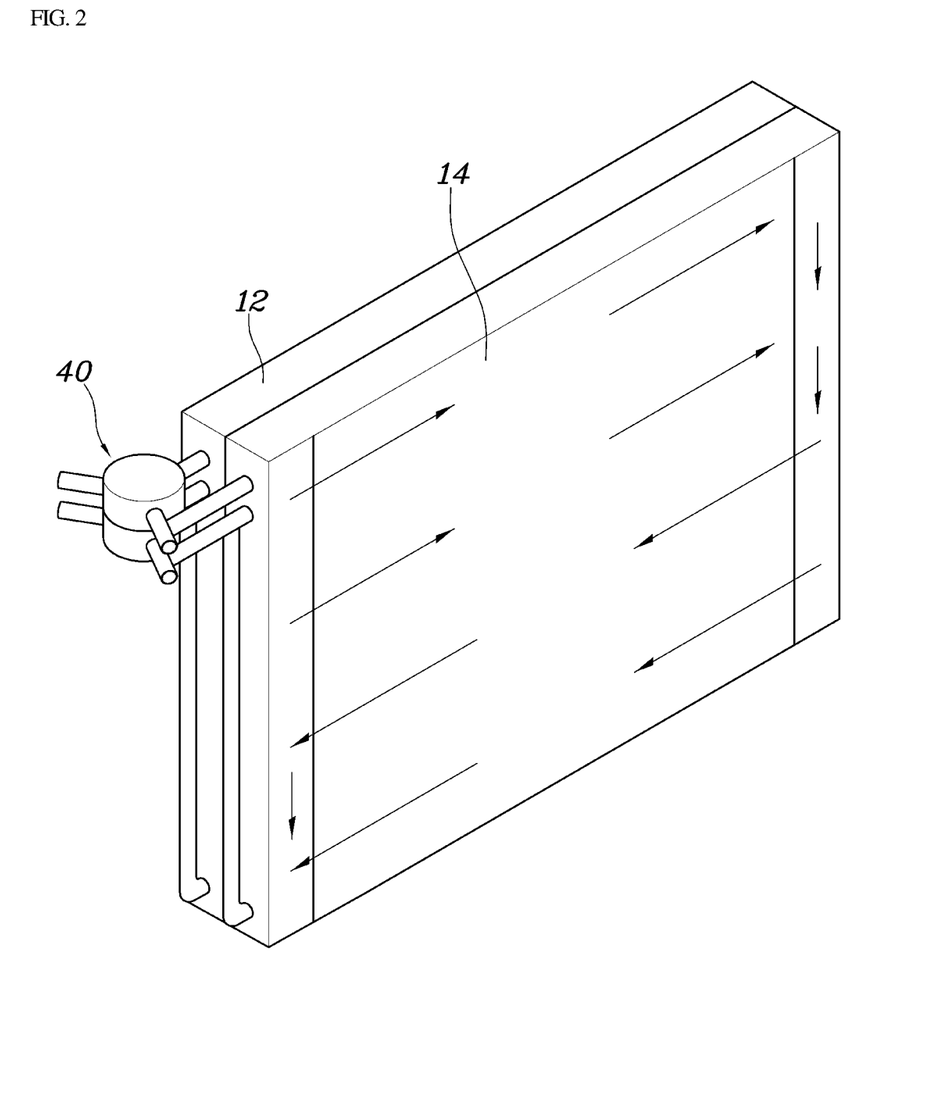
FIG. 2 is a perspective view schematically illustrating a radiator module and a valve module according to an exemplary embodiment of the present disclosure.
Figure 3:
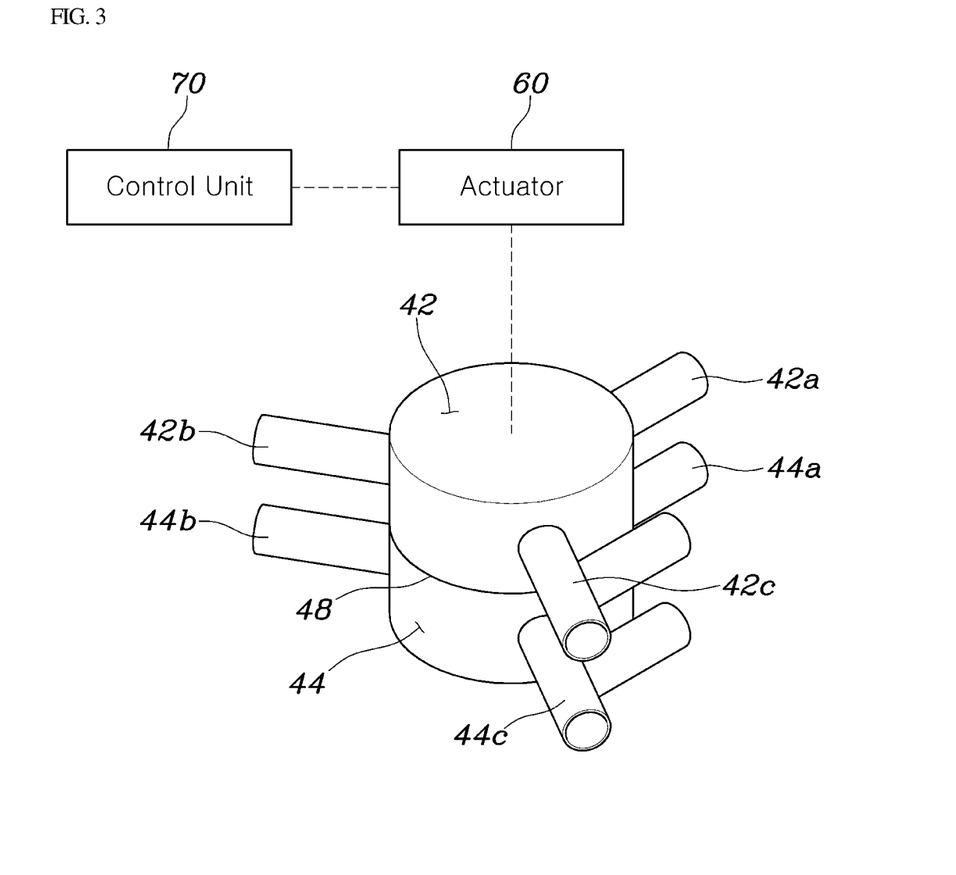
FIG. 3 is a perspective view illustrating the valve module according to an exemplary embodiment of the present disclosure.
Figure 4A:
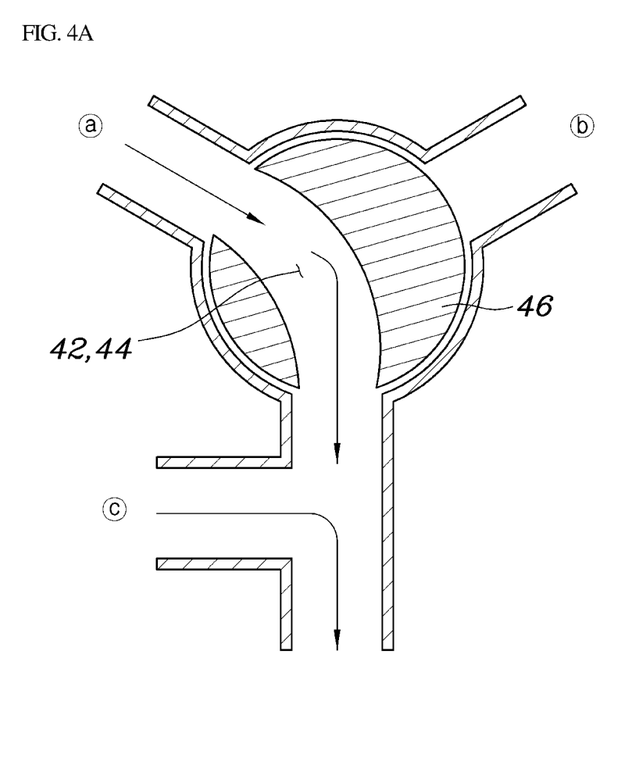
FIGS. 4A to 4C are cross-sectional views illustrating the operation of the valve module according to an exemplary embodiment of the present disclosure.
Figure 4B:
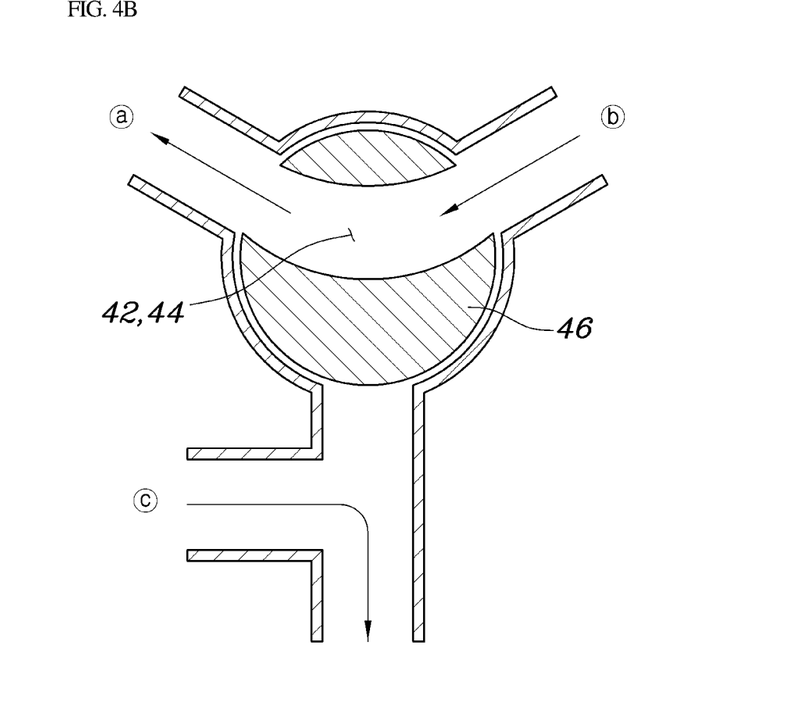
Figure 4C:
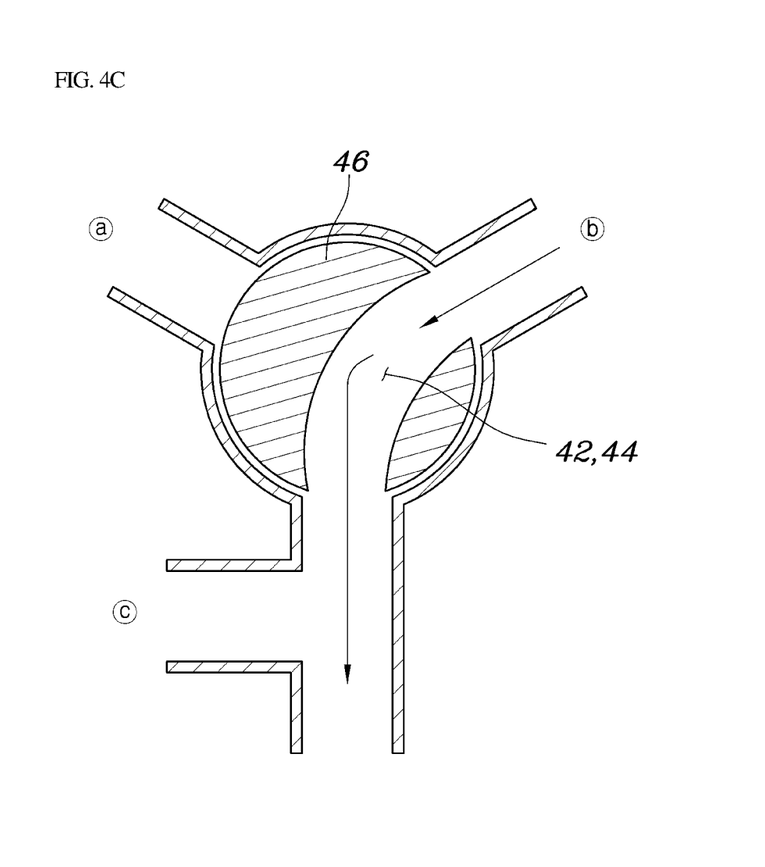

FIG. 2 is a perspective view schematically illustrating the radiator module 10 and the valve module 40 according to an exemplary embodiment of the present disclosure, FIG. 3 is a perspective view illustrating the valve module according to an exemplary embodiment of the present disclosure, and FIGS. 4A to 4C are cross-sectional views illustrating the operation of the valve module of the present disclosure.

Referring to FIGS. 2 and 3, the battery radiator 12 and the electric component radiator 14 may be arranged next to each other in the thickness direction. In particular, the radiators may be disposed proximate to each other in the thickness direction since the heat radiation amount is greater than when the radiators are arranged in the vertical direction with the same heat radiating area. In addition, designing the thickness of the battery radiator 12 and the thickness of the electric component radiator 14 to be equal to each other is advantageous in view of heat radiation.

Therefore, according to the present disclosure, since the cooling water heat exchange efficiency of the radiator module 10 is maximized, sufficient cooling of the vehicle components may be performed and vehicle performance may be improved. The valve module 40 partitioned into upper and lower chambers may be disposed at one side of the radiator module 10 having the shape in which the radiators are stacked in the thickness direction, and the first passage 42*a* or 44*a* and the third passage 42*c* or 44*c* of each chamber may be directly connected to the battery radiator 12 and the electric component radiator 14. In particular, forming both of a cooling water inlet and a cooling water outlet on one side of the radiator module 10 may be advantageous in view of package volume.

In addition, as illustrated in FIGS. 4A to 4C, the valve module 40 may change the flow of the cooling water based on the rotation angle of the guide unit 46 integrally provided in each of the first and second chambers. FIG. 4A illustrates the rotation of the guide unit 46 when the first passage and the third passage are in communication with each other, FIG. 4B illustrates the rotation of the guide unit 46 when the first passage and the second passage are in communication with each other, and FIG. 4C illustrates the rotation of the guide unit 46 when the second passage and the third passage are in communication with each other.

Meanwhile, referring to FIG. 1, the passages in the first chamber 42 and the passages in the second chamber 44 may be connected to the cooling water inlet side and the cooling water outlet side of the components to be connected thereto, respectively, thereby causing the cooling water to circulate through the components and the battery radiator 12 or the electric component radiator 14. In other words, when the first chamber 42 introduces the cooling water into the battery radiator 12 or the electric component radiator 14, the second chamber 44 may be configured to receive the cooling water from the battery radiator 12 or the electric component radiator 14. The flow of cooling water may also be reversed.

Specifically, in the present disclosure, the high-voltage battery core 20 may be disposed between the second passage 42*b* in the first chamber 42 and the second passage 44*b* in the second chamber 44, to thus be connected in series to a first pump 25. In addition, a battery heat exchange line 50 may be disposed between the second passage 42*b* in the first chamber 42 and the second passage 44*b* in the second chamber 44, to thus be connected in parallel with the high voltage battery core 20 and the first pump 25 and to pass through a water heater 52 and a battery chiller 54. The flow of cooling water in battery heat exchange line 50 may be adjusted by an on-off valve 56.

The on-off valve 56 may be a three-way valve installed at an end of the battery heat exchange line 50 as illustrated in FIG. 1, or may be provided as an intermittent valve installed on the battery heat exchange line 50. In addition, the battery chiller 54 may be configured to separately heat exchange between the cooling water and the coolant circulating inside the vehicle. Therefore, the high-voltage battery may be cooled by the cooling water flowing through the radiator module 10 by closing the on-off valve 56, and the high-voltage battery may be cooled with the battery chiller 54 or warmed with the water heater 52 by opening the on-off valve 56. Detailed operation modes will be described later.

Figure 5:
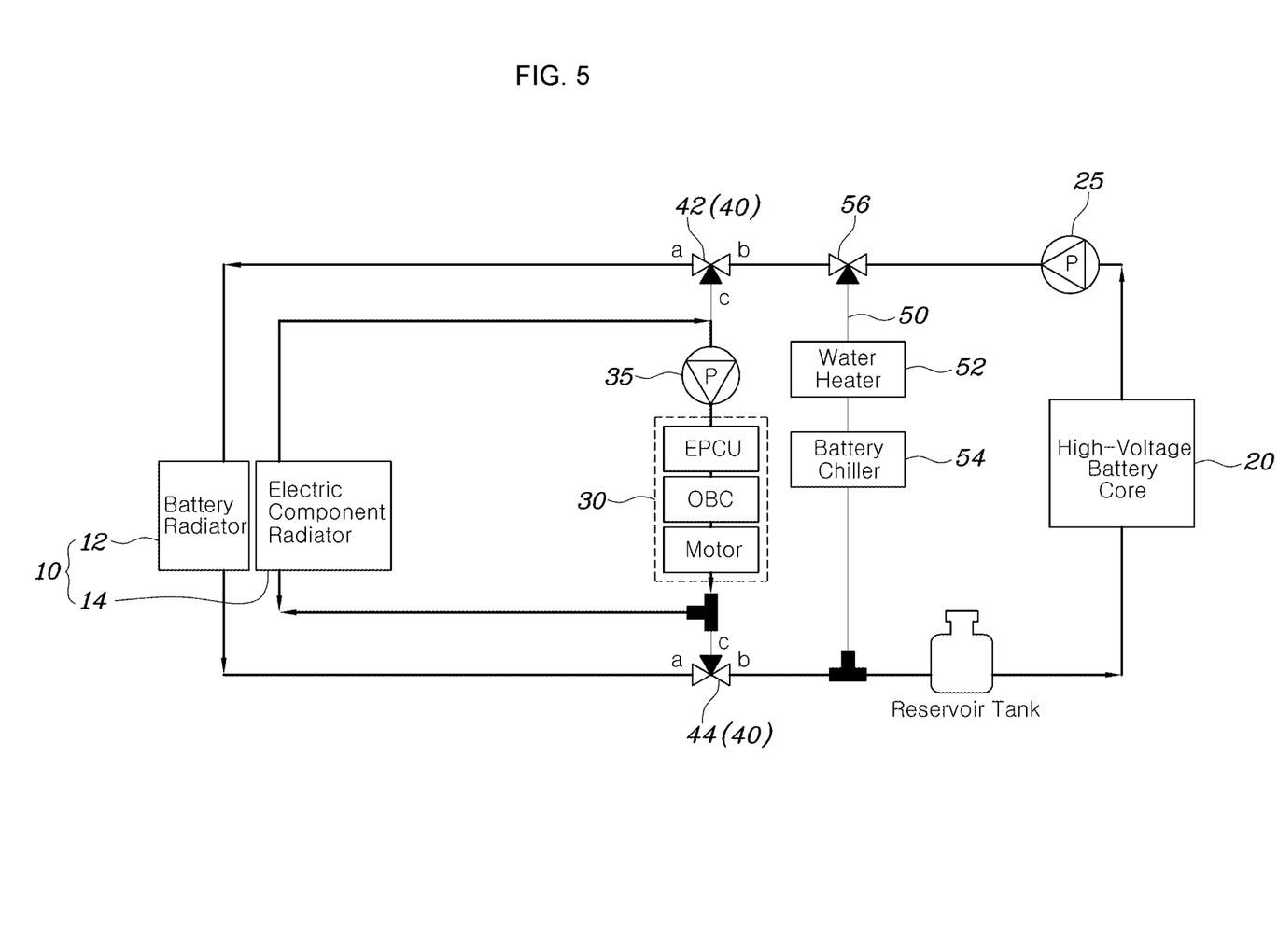
FIG. 5 is a view illustrating a flow of cooling water in a battery cooling mode according to an exemplary embodiment of the present disclosure.

Specifically, FIG. 5 is a view illustrating a flow of cooling water in a battery cooling mode according to an exemplary embodiment of the present disclosure. Referring to FIG. 5, the vehicle heat management system of the present disclosure may include a controller 70 configured to operate the actuator 60 to close the third passages 42*c* and 44*c* in the first chamber 42 and the second chamber 44, close the on-off valve 56, and drive the first pump 25 when battery cooling is required.

In other words, the valve module 40 may be operated to provide communication between the first passage and the second passage as illustrated in FIG. 4B. As a result, as illustrated by thick solid lines in FIG. 5, the cooling water discharged from the first pump 25 may circulate through the first chamber 42, the battery radiator 12, the second chamber 44, a reservoir tank, and the high-voltage battery core 20. Accordingly, the cooling of the high-voltage battery may be performed by the cooling water circulating through the battery radiator 12 and the high-voltage battery core 20. In particular, the controller 70 may be configured to selectively operate the second pump 35 to cool the electric component core 30 through the electric component radiator 14.

Figure 6:
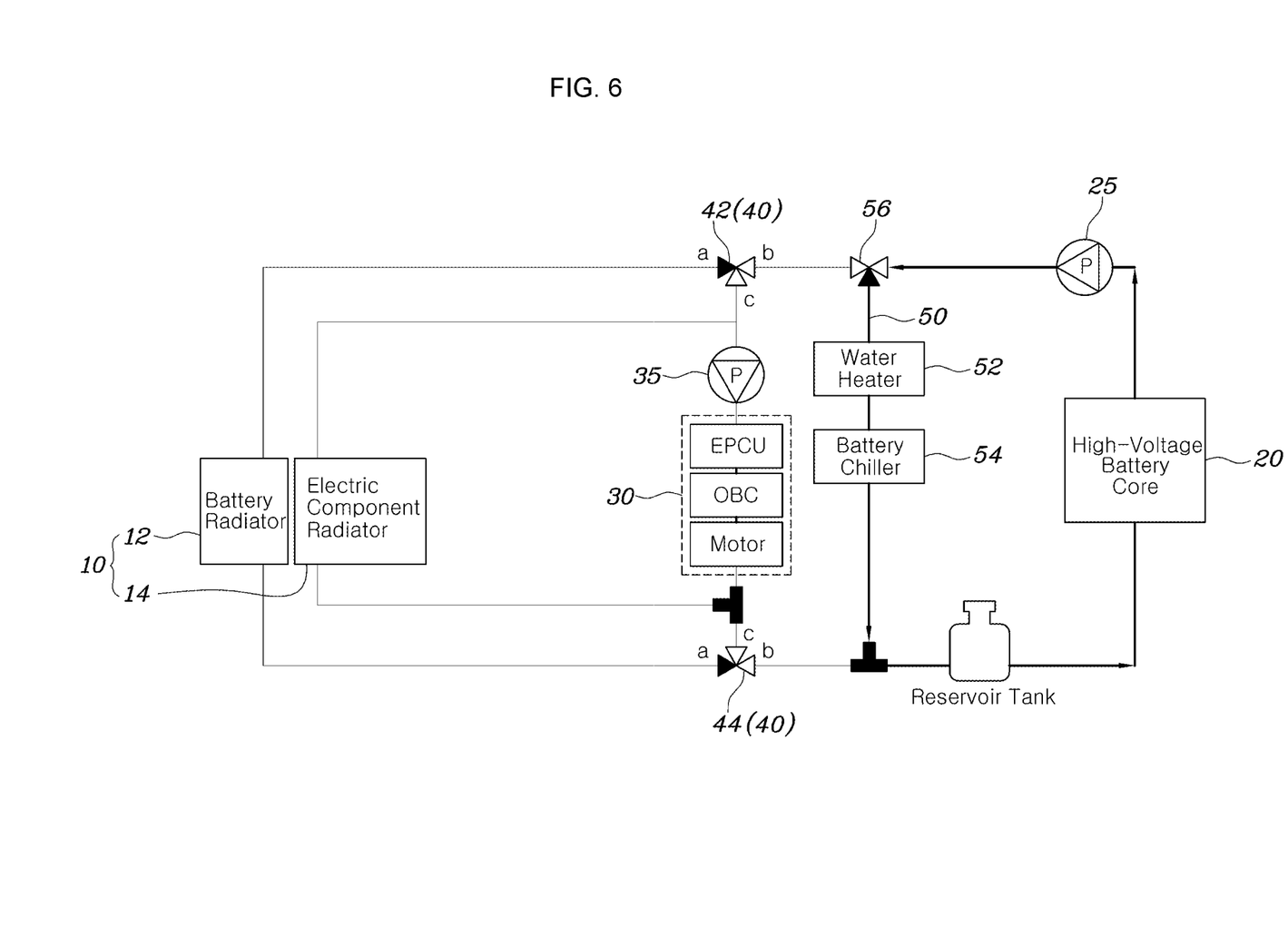
FIG. 6 is a view illustrating a flow of cooling water in a battery heater warming mode according to an exemplary embodiment of the present disclosure.

Meanwhile, FIG. 6 is a view illustrating a flow of cooling water in a battery heater warming mode according to an exemplary embodiment of the present disclosure. Referring to FIG. 6, the controller 70 may be configured to operate the actuator 60 to close the second passages 42*b* and 44*b* in the first chamber 42 and the second chamber 44, open the on-off valve 56, drive the first pump 25, and operate the water heater 52 when battery heater warming is required.

In other words, the valve module 40 may be operated to close the second the second passage as illustrated in FIG. 4A, and thus, the cooling water discharged from the first pump 25 may circulate through the water heater 52, the battery chiller 54, and the high-voltage battery 20. When the water heater 52 operates, the cooling water may be warmed, and thus, the warmed cooling water may be supplied to the high-voltage battery core 20. According to this, it may be possible to more accurately adjust the temperature of the cooling water circulating through the high-voltage battery core 20. In addition, in the vehicle heat management system of the present disclosure, the electric component core 30 and the second pump 35 may be connected to each other in series between the third passage 42*c* in the first chamber 42 and the third passage 44*c* in the second chamber 44, and the electric component radiator 14 may be connected to the electric component core 30 and the second pump 35 in parallel.

Figure 7:
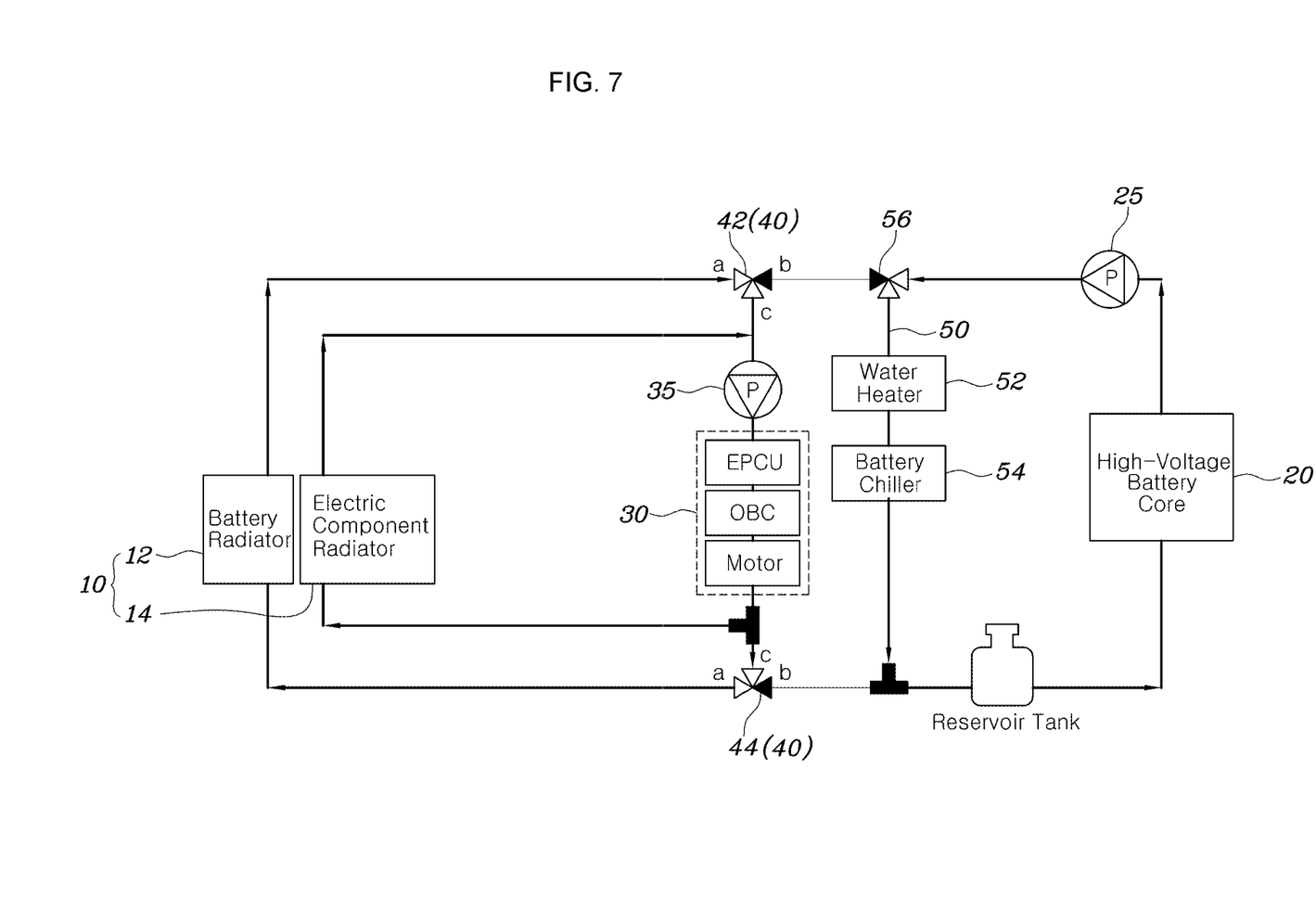
FIG. 7 is a view illustrating a flow of cooling water in an electric component cooling and battery coolant cooling mode according to an exemplary embodiment of the present disclosure.

FIG. 7 is a view illustrating a flow of cooling water in an electric component cooling and battery coolant cooling mode according to an exemplary embodiment of the present disclosure. Referring to FIG. 7, the controller 70 of the present disclosure may be configured to operate the actuator 60 to close the second passages 42*b* and 44*b* in the first chamber 42 and the second chamber 44, open the on-off valve 56, and drive the first pump 25 and the second pump 35 when the electric component cooling and battery coolant cooling are required.

In other words, when the first and second pumps 25 and 35 are operated in the state in which the valve module 40 is operated as illustrated in FIG. 4B and the on-off valve 56 is opened, the cooling water may circulate between the electric component core 30 and the radiator module 10 and the cooling water may circulate between the high-voltage battery core 20 and the battery chiller 54, to thus cool the high-voltage battery and the electric components.

Figure 8:
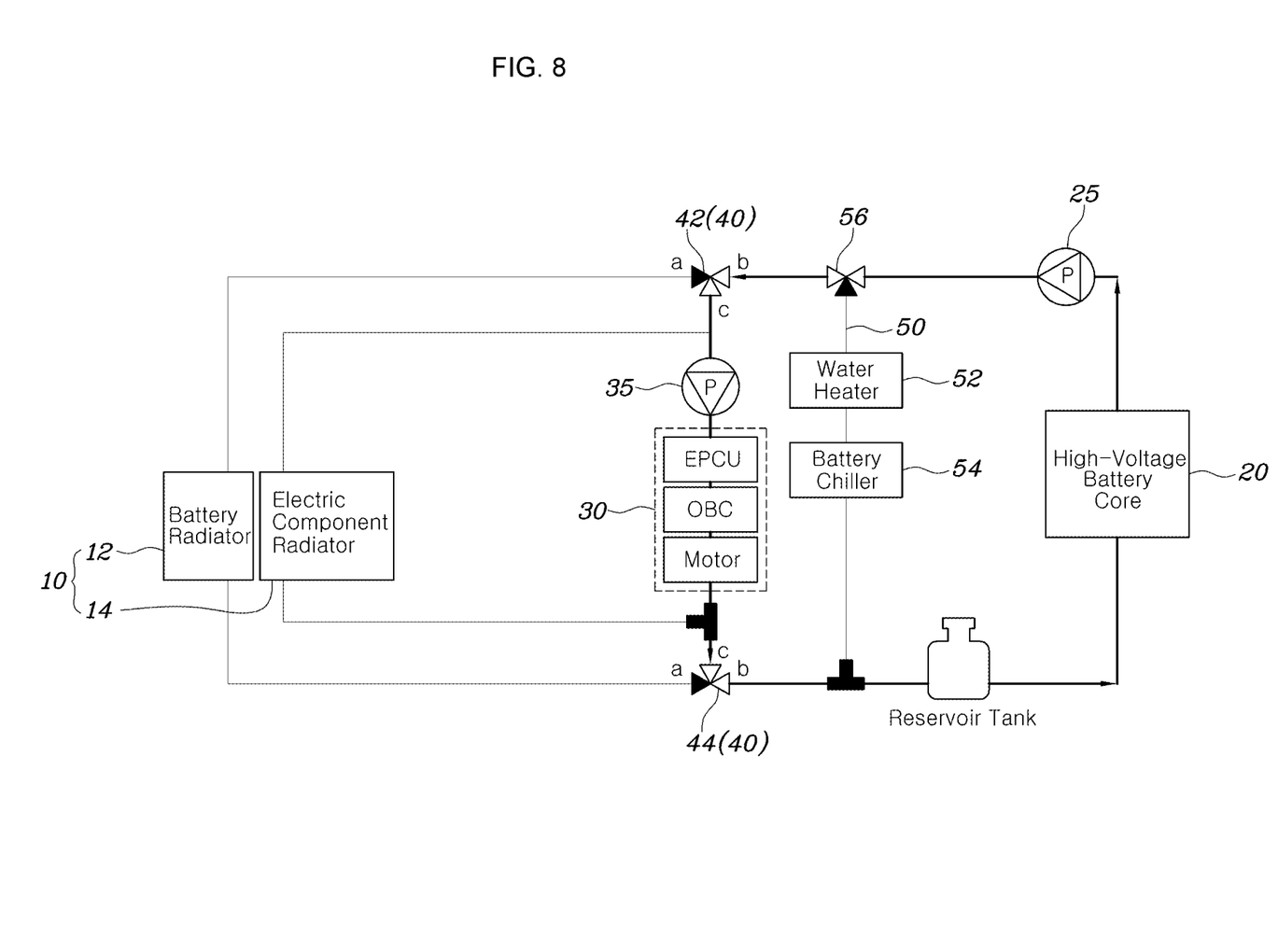
FIG. 8 is a view illustrating a flow of cooling water in an electric component waste heat recovery mode according to an exemplary embodiment of the present disclosure.

FIG. 8 is a view illustrating a flow of cooling water in an electric component waste heat recovery mode according to an exemplary embodiment of the present disclosure. Referring to FIG. 8, the controller 70 of the present disclosure may be configured to operate the actuator 60 to close the first passages 42*a* and 44*a* in the first chamber 42 and the second chamber 44, close the on-off valve 56, and drive the first pump 25 or the second pump 35 when electric component waste heat recovery is required.

When the valve module 40 provides communication between the second and third passages as illustrated in FIG. 4C and the on-off valve 56 may be closed, the cooling water may circulate between the high-voltage battery core 20 and the electric component core 30. Among the electric components, an on-board charger (OBC) may be configured to charge the high-voltage battery, and a substantial amount of heat is generated in this process. Therefore, the cooling water passing through the electric component core 30 absorbs the waste heat of the OBC. The warmed cooling water may be supplied to the high-voltage battery core 20, thereby warming the high-voltage battery. Therefore, the high-voltage battery may be warmed even when the heater is not operated separately, and therefore, the fuel efficiency of the electric vehicle may be secured while optimizing the thermal efficiency of the battery.

Figure 9:
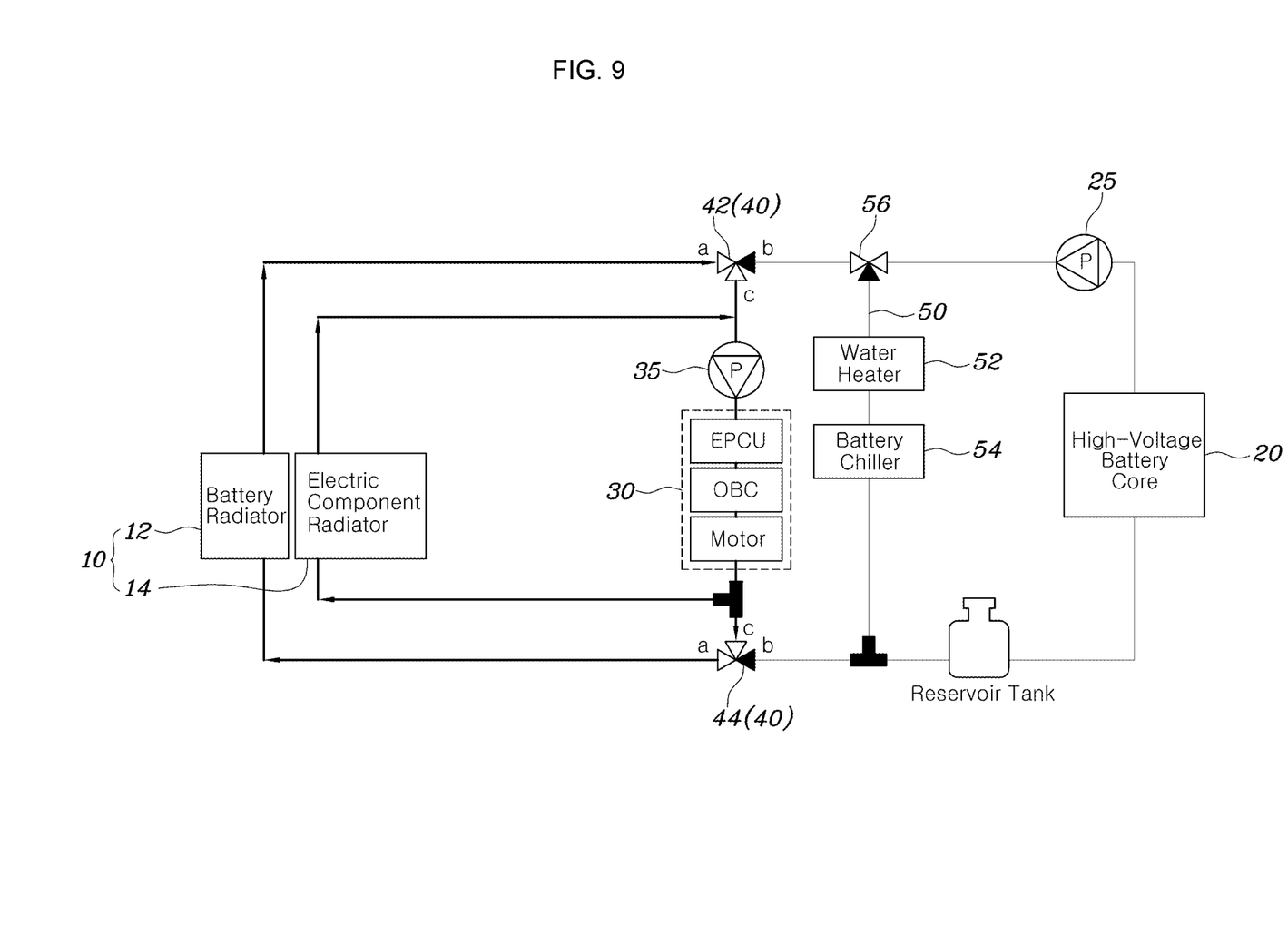
FIG. 9 is a view illustrating a flow of cooling water in an electric component cooling mode according to an exemplary embodiment of the present disclosure.

FIG. 9 is a view illustrating a flow of cooling water in an electric component cooling mode according to an exemplary embodiment of the present disclosure. Referring to FIG. 9, the controller 70 of the present disclosure may be configured to operate the actuator 60 to close the second passages 42*b* and 44*b* in the first chamber 42 and the second chamber 44, and drive the second pump 35 when the electric component cooling is required.

When the valve module 40 provides communication between the first and third passages as illustrated in FIG. 4A, the cooling water discharged from the second pump 35 may circulate through the electric component core 30 and the electric component radiator 14, or may circulate through the electric component core 30, the second chamber 44, the battery radiator 12, and the first chamber 42. In other words, since the electric component core 30 is provided to exchange heat with the entire radiator module 10 through the cooling water, the cooling performance of electric components may be maximized.

Finally, referring to FIG. 5, the controller 70 of the present disclosure may be configured to operate the actuator 60 to close the third passages 42*c* and 44*c* in the first chamber 42 and the second chamber 44, close the on-off valve 56, and drive the first pump 25 and the second pump 35 when the electric component cooling and battery cooling are required. In other words, when the electric components and the high-voltage battery are to be cooled only through the radiator module 10, the valve module 40 may be operated as illustrated in FIG. 4B and the on-off valve 56 may be closed to cool the high-voltage battery core 20 by the battery radiator 12, and the electric component core 30 may be cooled by the electric component radiator 14.

According to the vehicle heat management system constructed as described above, it may be possible to vary the heat radiating area of the heat exchange radiators of the high-voltage battery core and the electric component core depending on the state of the electric vehicle, and thus, optimal heat management efficiency may be implemented and merchantable quality of the vehicle may be improved. In addition, in the radiator module, the battery radiator and the electric component radiator are configured to have optimal heat exchange efficiency, so that the heat management performance of the vehicle may be improved.

While the present disclosure has been illustrated and explained with respect to specific embodiments thereof, it will be obvious to a person ordinarily skilled in the art that the present disclosure can be variously modified and changed without departing from the scope of the technical idea of the present disclosure, which is defined by the accompanying claims.

What is claimed is:

1. A vehicle heat management system, comprising:
    a radiator module including a battery radiator and an electric component radiator;
    a valve module having an inner space divided into a first chamber and a second chamber, each of which includes a first passage, a second passage, and a third passage, wherein the first passage connects each of the chambers to the battery radiator, the second passage connects each of the chambers to a high-voltage battery core, and the third passage connects each of the chambers to the electric component radiator and an electric component core, and each of the chambers includes therein a guide unit configured to adjust an opening degree of the first passage, the second passage, or the third passage based on a rotation angle thereof; and
    an actuator connected to the guide unit to adjust a movement of the guide unit.

2. The vehicle heat management system of claim 1, wherein the valve module includes a separation wall that divides the inner space of the valve module into upper and lower portions to divide the inner space of the valve module into the first chamber in the upper portion and the second chamber in the lower chamber.

3. The vehicle heat management system of claim 1, wherein the guide unit is configured to close, by rotation, corresponding passages among the first, second, and third passages disposed in the first chamber and the first, second, and third passages disposed in the second chamber.

4. The vehicle heat management system of claim 1, wherein, in the radiator module, the battery radiator and the electric component radiator are arranged to be stacked in the thickness direction.

5. The vehicle heat management system of claim 1, wherein the passages in the first chamber and the passages in the second chamber are connected to a cooling water inlet side and a cooling water outlet side of components, which are connected thereto, respectively, to cause the cooling water to circulate through the components and the battery radiator or the electric component radiator.

6. The vehicle heat management system of claim 5, wherein the high-voltage battery core is disposed between the second passage in the first chamber and the second passage in the second chamber to be connected in series to a first pump.

7. The vehicle heat management system of claim 6, wherein a battery heat exchange line is disposed between the second passage in the first chamber and the second passage in the second chamber to be connected to the high-voltage battery core and the first pump in parallel and to pass through a water heater and a battery chiller, wherein a flow of cooling water in the battery heat exchange line is adjusted by an on-off valve.

8. The vehicle heat management system of claim 7, further comprising:
    a controller configured to operate the actuator to close the third passages in the first chamber and the second chamber, close the on-off valve, and drive the first pump when battery cooling is required.

9. The vehicle heat management system of claim 7, further comprising:
    a controller configured to operate the actuator to close the second passages in the first chamber and the second chamber, open the on-off valve, drive the first pump, and operate the water heater when battery heater warming is required.

10. The vehicle heat management system of claim 7, wherein the electric component core and a second pump are disposed between the third passage in the first chamber and the third passage in the second chamber to be connected in series to each other, and the electric component radiator is connected in parallel to the electric component core and the second pump.

11. The vehicle heat management system of claim 10, further comprising:
    a controller configured to operate the actuator to close the second passages in the first chamber and the second chamber, open the on-off valve, and drive the first pump and the second pump when electric component cooling and battery coolant cooling are required.

12. The vehicle heat management system of claim 10, further comprising:
    a controller configured to operate the actuator to close the first passages in the first chamber and the second chamber, close the on-off valve, and drive the first pump or the second pump when electric component waste heat recovery is required.

13. The vehicle heat management system of claim 10, further comprising:
    a controller configured to operate the actuator to close the second passages in the first chamber and the second chamber, and drive the second pump when electric component cooling is required.

14. The vehicle heat management system of claim 10, further comprising:
    a controller configured to operate the actuator to close the third passages in the first chamber and the second chamber, close the on-off valve, and drive the first pump and the second pump when electric component cooling and battery cooling are required.

* * * * *